(12) United States Patent
Nakamura

(10) Patent No.: US 6,728,657 B2
(45) Date of Patent: Apr. 27, 2004

(54) MACHINING TIME ESTIMATION APPARATUS FOR NC MACHINE TOOL

(75) Inventor: Takayuki Nakamura, Yamatokoriyama (JP)

(73) Assignees: Mori Seiki Co., Ltd., Yamatokoriyama (JP); Intelligent Manufacturing Systems International, Sacramento, CA (US)

(*) Notice: Subject to any disclaimer, the term of this patent is extended or adjusted under 35 U.S.C. 154(b) by 0 days.

(21) Appl. No.: 10/315,177

(22) Filed: Dec. 10, 2002

(65) Prior Publication Data

US 2003/0110006 A1 Jun. 12, 2003

(30) Foreign Application Priority Data

Dec. 11, 2001 (JP) .......................... 2001-377275

(51) Int. Cl.[7] .......................... G04F 1/00; G06F 15/16; G06F 15/46
(52) U.S. Cl. .......................... 702/178; 700/3; 700/174
(58) Field of Search .......................... 702/33, 94, 176, 702/177, 178; 703/6; 700/3, 97, 100, 160, 174; 318/569

(56) References Cited

U.S. PATENT DOCUMENTS

| | | | | |
|---|---|---|---|---|
| 4,281,379 A | * | 7/1981 | Austin | 700/3 |
| 5,428,547 A | * | 6/1995 | Ikeda | 700/174 |
| 6,584,415 B1 | * | 6/2003 | Uneme et al. | 702/34 |

OTHER PUBLICATIONS

Abstract of Japanese Unexamined Publication No. 05–63749 dated Aug. 24, 1993/Discussed in the specification.

Patent Abstracts of Japan No. 61–043304 dated Mar. 1, 1986.

Patent Abstracts of Japan No. 62–172406 dated Jul. 29, 1987.

Patent Abstracts of Japan No. 02–053551 dated Feb. 22, 1990.

Patent Abstracts of Japan No. 05–309546 dated Nov. 22, 1993.

Patent Abstracts of Japan No. 11–028643 dated Feb. 2, 1999.

* cited by examiner

*Primary Examiner*—John Barlow
*Assistant Examiner*—John Le
(74) *Attorney, Agent, or Firm*—Westerman, Hattori, Daniels & Adrian, LLP

(57) ABSTRACT

A machining time estimation apparatus 20, capable of accurate machining time calculation, including a database 22 for storing the actual operation time data of miscellaneous functions, an actual operation time calculation section 21 for calculating the actual operation time of each miscellaneous function to update the data stored in the database 22, and an operation time estimation section 24 for analyzing an NC program, block by block, for calculating the estimated operation time of axis movement on the basis of the result of the analysis, for estimating the operation time of each miscellaneous function by searching the database 22 and for calculating the estimated operation time of each block and the estimated machining time of the whole program on the basis of the estimated operation time of the axis movement and the estimated operation time of the miscellaneous function.

8 Claims, 10 Drawing Sheets

FIG. 6

| Code | Average operation time Ta (sec) | Sample number P (pieces) |
|---|---|---|
| M5 | 0.5 | 12 |
| M6 | 1.2 | 1 |
| M8 | 0.4 | 2 |
| M9 | 0.3 | 2 |
| M19 | 0.2 | 1 |
| : | : | : |

FIG. 7

| Indexing interval | Average operation time Ta (sec) | Sample number P (pieces) |
|---|---|---|
| 1 | 0.7 | 5 |
| 2 | 0.9 | 6 |
| 3 | 1.0 | 3 |
| 4 | 1.1 | 2 |
| 5 | 1.3 | 2 |

FIG. 8

| Spindle rotation speed (min$^{-1}$) | Average operation time Ta (sec) | Sample number P (pieces) |
|---|---|---|
| 100 | 0.1 | 2 |
| 200 | 0.1 | 2 |
| 300 | 0.1 | 2 |
| : | : | : |
| 800 | 0.2 | 5 |
| : | : | : |
| 1000 | 0.3 | 10 |
| : | : | : |
| 5000 | 0.7 | 12 |
| : | : | : |

FIG. 9

| O number | Estimated machining time (sec) | Actual machining time (sec) | Error rate (%) | Allowable error rate (%) | Workpieces to be machined (pieces) | Allowable error time (sec) |
|---|---|---|---|---|---|---|
| ○○○○ | 203 | 205 | 1 | 2 | 1000 | 1800 |
| ○○○○ | — | — | — | 2 | — | 1800 |
| ○○○○ | — | — | — | 2 | — | 1800 |
| ○○○○ | — | — | — | 2 | — | 1800 |
| : | : | : | : | : | : | : |

FIG. 10

| O number | Block number | Estimated operation time (sec) | Actual operation time (sec) | Error rate (%) | Allowable error rate (%) |
|---|---|---|---|---|---|
| ○○○○1 | First | 0.3 | 0.3 | 0 | 2 |
|  | Second | 0.55 | 0.53 | 4 | 2 |
|  | : | : | : | : | : |
|  | : | : | : | : | : |
| ○○○○2 | First | — | — | — | 2 |
|  | Second | — | — | — | 2 |
|  | : | : | : | : | : |

FIG. 12

|   | M mode | Function | Automatically creating check box |
|---|---|---|---|
| 1 | M5 | Spindle stop | ○ |
| 2 | M6 | ATC | ○ |
| 3 | M8 | Coolant ON | ○ |
| 4 | M9 | Coolant OFF | ○ |
| 5 | M10 | 4-axis clamp | × |
| 6 | M11 | 4-axis unclamp | × |
| 7 | M19 | Spindle orientation | ○ |
| 8 | M33 | Tool storage | ○ |
| ⋮ | ⋮ | ⋮ | ⋮ |

FIG. 13

|   | Spindle rotation speed ($min^{-1}$) |
|---|---|
| 1 | 100 |
| 2 | 200 |
| 3 | 300 |
| 4 | 500 |
| 5 | 800 |
| 6 | 1000 |
| 7 | 2000 |
| 8 | 3000 |
| 9 | 5000 |
| 10 | 8000 |
| 11 | 10000 |
| 12 | 15000 |
| ⋮ | ⋮ |

MACHINING TIME ESTIMATION APPARATUS FOR NC MACHINE TOOL

BACKGROUND OF THE INVENTION

1. Field of the Invention

The present invention relates to a machining time estimation apparatus for estimating the machining time of a numerical control (NC) machine tool by analyzing an NC program for controlling the drive mechanisms of the NC machine tool.

2. Description of the Prior Art

As a conventional machining time estimation apparatus, an apparatus disclosed in Japanese Unexamined Utility Model Publication No. 5-63749 is known. This machining time estimation apparatus comprises a machining program storage section, a program interpreting section, an axis feed speed data storage section, an axis movement time calculation section, an MST operation time calculation section, an addition section, an MST operation time data storage section, a general-purpose M-code operation time data storage section, etc.

The program interpreting section reads an NC program stored in an NC program storage section, block by block, and interprets its contents and transmits axis movement commands and MST commands serving as miscellaneous function operation commands so as to be distributed to the axis movement time calculation section and the MST operation time calculation section, respectively. The miscellaneous functions are functions commanded as M, S and T codes in a machining program. Usually, M codes relate to spindle normal/reverse rotation commands, tool change commands, etc., S codes relate to spindle rotation speed, and T codes relate to tool designation, for example.

The axis movement time calculation section obtains the amount of axis movement on the basis of the axis movement commands transmitted from the program interpreting section, calculates an axis movement time on the basis of the obtained amount of the axis movement and the axis feed speed data stored in the axis feed speed data storage section, and transmits the time to the addition section.

On the other hand, the MST operation time calculation section reads applicable data from MST operation time data preset at each operation and stored in the MST operation time data storage section and the general-purpose M-code operation time data storage section on the basis of the MST commands transmitted from the program interpreting section and transmits the MST operation time obtained from the read data to the addition section. General-purpose M codes are codes allocated so as to be usable as desired by a user. Data on the operation time of the function set by the user is preset and stored in the general-purpose M-code operation time data storage section.

The addition section adds each operation time transmitted from the axis movement time calculation section and the MST operation time calculation section to calculate a machining time.

Hence, with this machining time estimation apparatus, the time required for applicable machining (machining time) can be known in advance from a machining program to be used for the machining, whereby it is possible to devise a detailed machining plan for a product to be obtained by the machining.

However, in actual practice, the axis movement time and the MST operation time are different depending on the kind of a machine tool and the state of the machine tool. In particular, the MST operation time changes frequently depending on a lapse of time and the incessantly changing state of the machine tool. For example, regarding the rotation of the spindle, the time required to reach its commanded rotation speed from the spindle stop state differs depending on the weight of a workpiece to be machined and the commanded rotation speed. In addition, when a tool is indexed to a machining position by swiveling the turret, the operation time differs depending on the interval between the currently indexed tool and the tool to be indexed next. Furthermore, the operation time changes depending on the change in the frictional resistance of the sliding portion. When the sliding portion is driven by hydraulic or pneumatic pressure, the operation time changes depending on the state of the pressure.

In the above-mentioned conventional machining time estimation apparatus, when the MST operation time is calculated, applicable operation time data is read from the operation time data preset as a fixed value regarding each MST operation and stored in the storage section, and the data is allocated as the MST operation time. Hence, when the actual MST operation time changes depending on a lapse of time and the incessantly changing state of the machine tool as described above, a problem of being incapable of accurate machining time calculation is caused.

For this reason, when a machining time is calculated by the above-mentioned conventional machining time estimation apparatus and when machining is carried out in accordance with a machining plan devised on the basis of the calculated machining times, the machining plan is deranged.

Accordingly, the present invention is intended to provide a machining time estimation apparatus capable of accurate machining time calculation.

SUMMARY OF THE INVENTION

The present invention for solving the above-mentioned problems relates to a machining time estimation apparatus for an NC machine tool, which estimates the machining time of the NC machine tool, comprising:

a program storage section for storing an NC program formed of a plurality of command blocks, a program analysis section for reading the NC program stored in the program storage section, for analyzing the NC program, block by block, and for outputting a control signal on the basis of the result of the analysis, a drive control section for receiving the control signal output from the program analysis section and for controlling the operation of each drive mechanism concerned with the axis movement and miscellaneous functions of the NC machine tool on the basis of the received control signal, wherein the machining time estimation apparatus further comprises:

a database for storing the actual operation time data of the drive mechanism concerned with the miscellaneous functions, actual operation time calculation means for calculating the actual operation time of the drive mechanism concerned with at least the miscellaneous functions on the basis of the control signal output from the program analysis section and an operation completion signal obtained from the drive mechanism and for updating the data stored in the database by using data on the calculated actual operation time, and operation time estimation means for analyzing each block of the NC program stored in the program storage section, for calculating the estimated operation time of the drive mechanism concerned with the axis movement on the basis of the result of the analysis, for estimating the operation time of the drive mechanism concerned with the miscellaneous functions by searching the database on the basis of the result of the analysis, for calculating the estimated operation time of each block on the basis of the estimated operation time of the drive mechanism concerned with the axis movement and the estimated operation time of the drive mechanism concerned with the miscellaneous functions, and for calculating the estimated machining time by totalizing the estimated operation time of each block.

With this machining time estimation apparatus, each time actual machining is carried out on the machine tool, the actual operation time of the drive mechanism concerned with at least the miscellaneous functions is calculated by the actual operation time calculation means. The data stored in the database is updated by the data on the calculated actual operation time. By this updating process, the reliability of the data stored in the database is enhanced.

The miscellaneous functions are functions other than axis movement functions and they are commanded as M, S and T codes in an NC program. Usually, M codes relate to spindle normal/reverse rotation commands, tool change commands, etc., S codes relate to spindle rotation speed, and T codes relate to tool designation, for example. The drive mechanisms for the miscellaneous functions are a mechanism for rotating the spindle and a mechanism for swiveling the turret, for example.

Furthermore, the updating process may be carried out by replacing the data stored in the database with the data on the calculated actual operation time. However, it is preferable that the actual operation time currently calculated is added to the total of the actual operation times calculated in the past thereby to calculate the average value thereof, and that the data stored in the database is replaced with the data on the calculated average value. With this configuration, noise can be eliminated, and a database conforming to the actual state can be obtained.

The operation time estimation means then carries out a machining time estimation process by using the database, the reliability of which is enhanced as described above. In other words, the NC program stored in the program storage section is analyzed, block by block. In the case when an axis movement command is issued, the amount of the axis movement is obtained on the basis of the axis movement command, and the estimated operation time of the axis movement is calculated on the basis of the obtained amount of the axis movement and a commanded axis feed speed. In the case when a miscellaneous function operation is commanded, the database is searched on the basis of the miscellaneous function operation command thereby to obtain the operation time of the miscellaneous function.

Furthermore, in the case when either the axis movement command or the miscellaneous function operation command is issued in one block, the time obtained by the above-mentioned process is used as the estimated operation time of the block. On the other hand, in the case when both the axis movement command and the miscellaneous function operation command are issued in one block and when the axis movement and the miscellaneous function operation are carried out sequentially, the time obtained by the above-mentioned process is added, and the resultant time is used as the estimated operation time of the block. In the case when the axis movement and the miscellaneous function operation are carried out in parallel with each other, the longer time of the times obtained by the above-mentioned process is used as the estimated operation time of the block.

After the estimated operation time of each block is calculated as described above, these estimated operation times are totalized to obtain an estimated machining time.

Hence, in this machining time estimation apparatus, regardless of the change of the actual operation time regarding the miscellaneous function with respect to time and with respect to the incessantly changing state of the machine tool, the machining time is calculated by using the database reflecting these actual states. Therefore, a highly accurate machining time conforming to the actual state of the machine tool can be calculated. For this reason, a machining plan to be devised by using this machining time can be made highly reliable.

In addition to carrying out the above-mentioned process, the actual operation time calculation means may be configured to calculate the actual operation time of the drive mechanism concerned with the axis movement on the basis of the control signal output from the program analysis section and the operation completion signal obtained from the drive mechanism, to calculate the actual operation time of each block on the basis of the calculated actual operation time of the drive mechanism concerned with the axis movement and the calculated actual operation time of the drive mechanism concerned with the miscellaneous function and to calculate an actual machining time by totalizing the calculated actual operation time of each block.

With this configuration, by comparing the actual operation time of each block and the actual machining time calculated by the actual operation time calculation means with the estimated operation time of each block and the estimated machining time calculated by the operation time estimation means, a check as to whether the result of the estimation conforms to the actual state of the machine tool or not can be carried out.

This kind of check can be carried out automatically by using a configuration, in addition to the above-mentioned configuration, comprising machining time storage means for storing data on the time calculated by the actual operation time calculation means and the time calculated by the operation time estimation means, and evaluation means for evaluating the operation state of the drive mechanism by comparing the time data calculated by the actual operation time calculation means and stored in the machining time storage means with the time data calculated by the operation time estimation means and stored in the machining time storage means.

Furthermore, the evaluation means may be configured to compare the actual operation time data of each block and the actual machining time data calculated by the actual operation time calculation means with the estimated operation time data of each block and the estimated machining time data calculated by the operation time estimation means and to calculate the error rate therebetween. Moreover, when the calculated error rate exceeds a predetermined allowable value, the evaluation means may also be configured to output an alarm. In this case, it is more preferable that if the cause of the alarm is known, the cause is also output together with the alarm.

Still further, the apparatus may also be provided with program generating means for receiving the input of command codes corresponding to the miscellaneous functions from the outside, for automatically generating an NC program, that operates the drive mechanisms concerned with the miscellaneous functions and is used to update the database, on the basis of the received command codes, and for storing the automatically generated NC program in the program storage section. With this configuration, by operating the NC machine tool in accordance with the NC program generated by the program generating means, the database can be updated without carrying out actual machining. Hence, the reliability of the database can be enhanced efficiently.

BRIEF DESCRIPTION OF THE DRAWINGS

FIG. 6 is an explanatory view showing an example of data to be stored in a miscellaneous function operation time database in accordance with this embodiment;

FIG. 7 is an explanatory view showing an example of data to be stored in the miscellaneous function operation time database in accordance with this embodiment;

FIG. 8 is an explanatory view showing an example of data to be stored in the miscellaneous function operation time database in accordance with this embodiment;

FIG. 9 is an explanatory view showing an example of data to be stored in a machining time storage section in accordance with this embodiment;

FIG. 10 is an explanatory view showing an example of data to be stored in the machining time storage section in accordance with this embodiment;

FIG. 12 is an explanatory view showing an example of data to be stored in a program generating data storage section in accordance with the second embodiment;

FIG. 13 is an explanatory view showing an example of data to be stored in the program generating data storage section in accordance with the second embodiment; and FIG. 14 is an explanatory view showing an example of an operation program to be generated by an operation program generating section in accordance with the second embodiment.

DESCRIPTION OF THE PREFERRED EMBODIMENT

Figure 1:
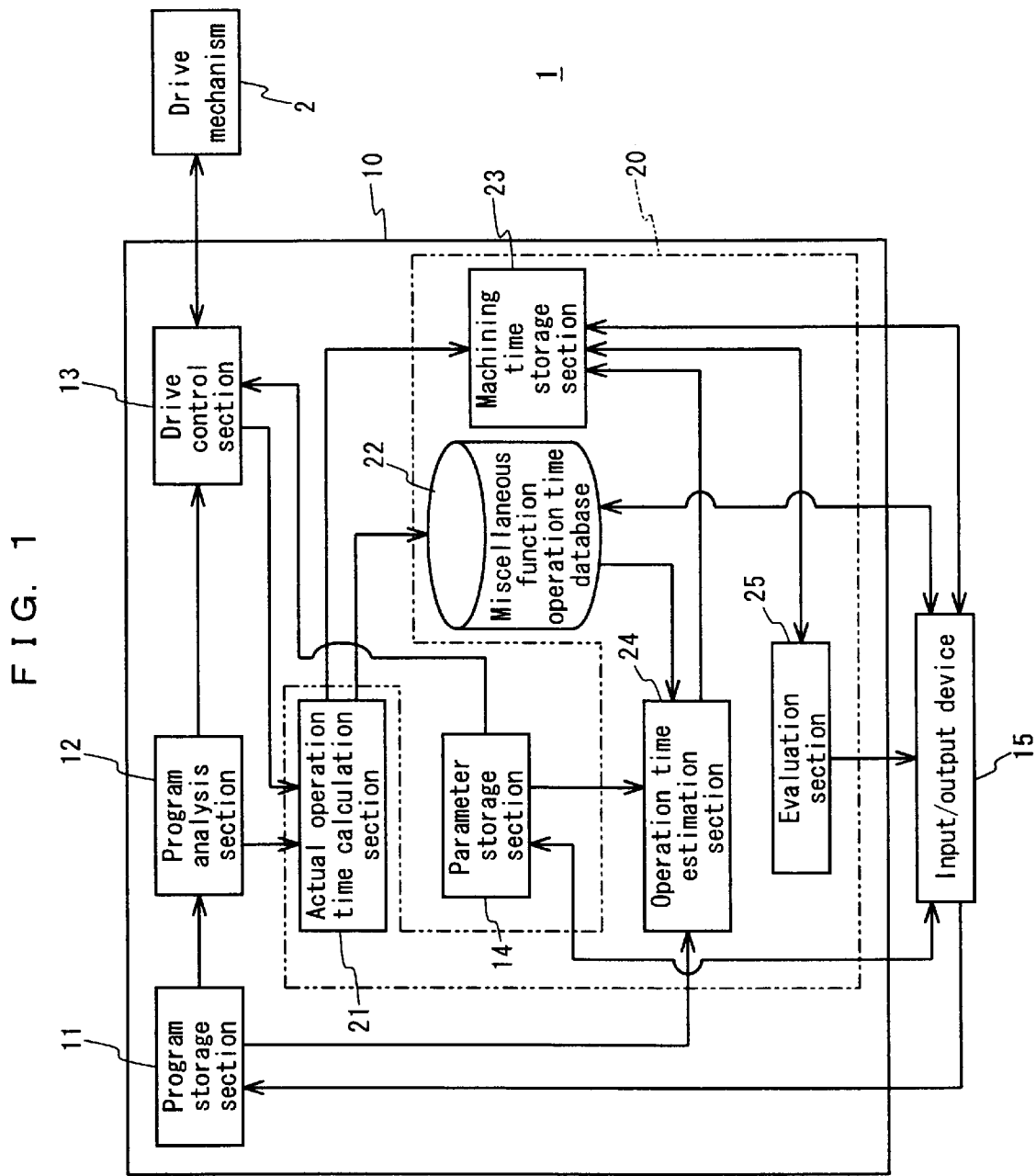
FIG. 1 is a block diagram showing a general configuration of a machining time estimation apparatus in accordance with an embodiment of the present invention.

A preferred embodiment in accordance with the present invention will be described below referring to the accompanying drawings. FIG. 1 is a block diagram showing a schematic configuration of a machining time estimation apparatus in accordance with an embodiment of the present invention.

As shown in FIG. 1, a machining time estimation apparatus 20 in accordance with this embodiment is provided inside a numerical controller 10 of an NC machine tool 1.

The NC machine tool 1 has an ordinary configuration and is not detailed herein. A drive mechanism 2 includes a feed mechanism formed of ball screws and the like, a spindle rotation drive mechanism, a turret indexing mechanism, drive mechanisms for an automatic pallet changer (APC) and an automatic tool changer (ATC), etc. In addition, an input/output device 15 comprises a CRT, a keyboard, etc. provided on an operating panel.

Furthermore, the numerical controller 10 comprises a CPU, RAM, ROM, auxiliary storage device, etc. and is provided with a program storage section 11, a program analysis section 12, a parameter storage section 14, a drive control section 13, etc. as shown in the figure. The program storage section 11 is a functional section for storing an NC program formed of a plurality of command blocks. The NC program is input via the input/output device 15 and stored in the program storage section 11. Still further, the parameter storage section 14 is a functional section for storing parameters regarding the acceleration/deceleration speed and the quick traverse speed of the feed mechanism, the acceleration/deceleration speed of the spindle rotation drive mechanism, etc. Parameters input via the input/output device 15 are stored in the parameter storage section 14.

The program analysis section 12 reads and analyses the program stored in the program storage section 11, block by block, and outputs a control signal corresponding to the result of the analysis to the drive control section 13. The NC program includes axis movement commands for moving the slide rest by driving the feed mechanism and commands regarding miscellaneous functions other than axis movement. The miscellaneous functions are functions commanded as M, S and T codes in the NC program. Usually, M codes relate to spindle normal/reverse rotation commands, tool change commands, etc., S codes relate to spindle rotation speed, and T codes relate to tool designation, for example.

The program analysis section 12 generates control signals corresponding to the above-mentioned commands and outputs the signals to the drive control section 13. For example, in the case of a command regarding axis movement, a signal regarding movement axis (X, Y or Z specified depending on the movement direction of the feed mechanism), a signal regarding the position of a movement destination and a signal regarding feed speed are output to the drive control section 13. In the case of an S code, a signal regarding spindle rotation speed is output to the drive control section 13. In the case of a T code, a signal regarding a turret number and an index execution signal is output to the drive control section 13. The control signals output from the program analysis section 12 are also transmitted to an actual operation time calculation section 21 described later.

The drive control section 13 generates control signals for driving the drive mechanism 2 on the basis of the control signals received from the program analysis section 12 and parameters regarding acceleration/deceleration speed, quick traverse speed, etc. stored in the parameter storage section 14. The drive control section 13 then transmits the signals to the drive mechanism 2 to control the operation thereof. Each of the feed mechanism and the spindle rotation drive mechanism is subjected to feedback control. In addition, in each of other drive mechanisms, the completion signal of the operation thereof is returned from the drive mechanism to the drive control section 13. Furthermore, the drive control section 13 confirms the completion of the command operation in accordance with the feedback signal and the returned operation completion signal and transmits the control signal for the next operation to the drive mechanism 2 and also transmits the operation completion signal to the actual operation time calculation section 21 described later.

Still further, the machining time estimation apparatus 20 comprises the actual operation time calculation section 21, a miscellaneous function operation time database 22, a machining time storage section 23, an operation time estimation section 24 and an evaluation section 25 as shown in the figure.

The actual operation time calculation section 21 is a processing section for calculating the actual operation time of the drive mechanism 2 on the basis of the control signals transmitted from the program analysis section 12 and the operation completion signal transmitted from the drive control section 13. More specifically, actual operation time calculation section 21 carries out the processes indicated in FIG. 2 and FIG. 3. These processes will be described later more specifically.

The miscellaneous function operation time database 22 is a functional section for storing data on the actual operation time of the drive mechanism 2 concerned with the miscellaneous function. This miscellaneous function actual operation time data is stored as a data table exemplified in FIG. 6 to FIG. 8, for example. The stored data is updated as necessary by the actual operation time data of the miscellaneous function calculated by the actual operation time calculation section 21.

The data table exemplified in FIG. 6 relates to an average operation time Ta for each M code and the sample number P thereof. The data table exemplified in FIG. 7 relates to the average operation time Ta corresponding to a turret indexing interval (the interval between the currently indexed tool and the tool to be indexed next) and the sample number P thereof. The data table exemplified in FIG. 8 relates to the average operation time Ta (the time required until the rotation speed of the spindle increases from the spindle stop state to the intended rotation speed of the spindle) corresponding to the rotation speed of the spindle and the sample number P thereof.

The operation time estimation section 24 is a processing section for analyzing the program stored in the program storage section 11 and for estimating the operation time of the drive mechanism 2 on the basis of the result of the analysis and the data stored in the miscellaneous function operation time database 22. More specifically, the operation time estimation section 24 carries out the process indicated in FIG. 4. This process will be described later more specifically.

The machining time storage section 23 is a functional section for storing data on the actual operation time calculated by the actual operation time calculation section 21 and data on the estimated operation time calculated by the operation time estimation section 24. The actual operation time data and the estimated operation time data are stored as data tables exemplified in FIG. 9 and FIG. 10, for example. The data table exemplified in FIG. 9 relates to the total operation time (machining time) of each NC program, and the data table exemplified in FIG. 10 relates to the operation time of each block of each NC program.

The evaluation section 25 is a processing section for evaluating the operation state of the drive mechanism 2 on the basis of the data stored in the machining time storage section 23. More specifically, the evaluation section 25 carries out the process indicated in FIG. 5. The data on the result evaluated by this evaluation section 25 is stored in the machining time storage section 23. This process will also be described later more specifically.

The processes by the actual operation time calculation section 21, the operation time estimation section 24 and the evaluation section 25 will be described below more specifically.

Figure 2:
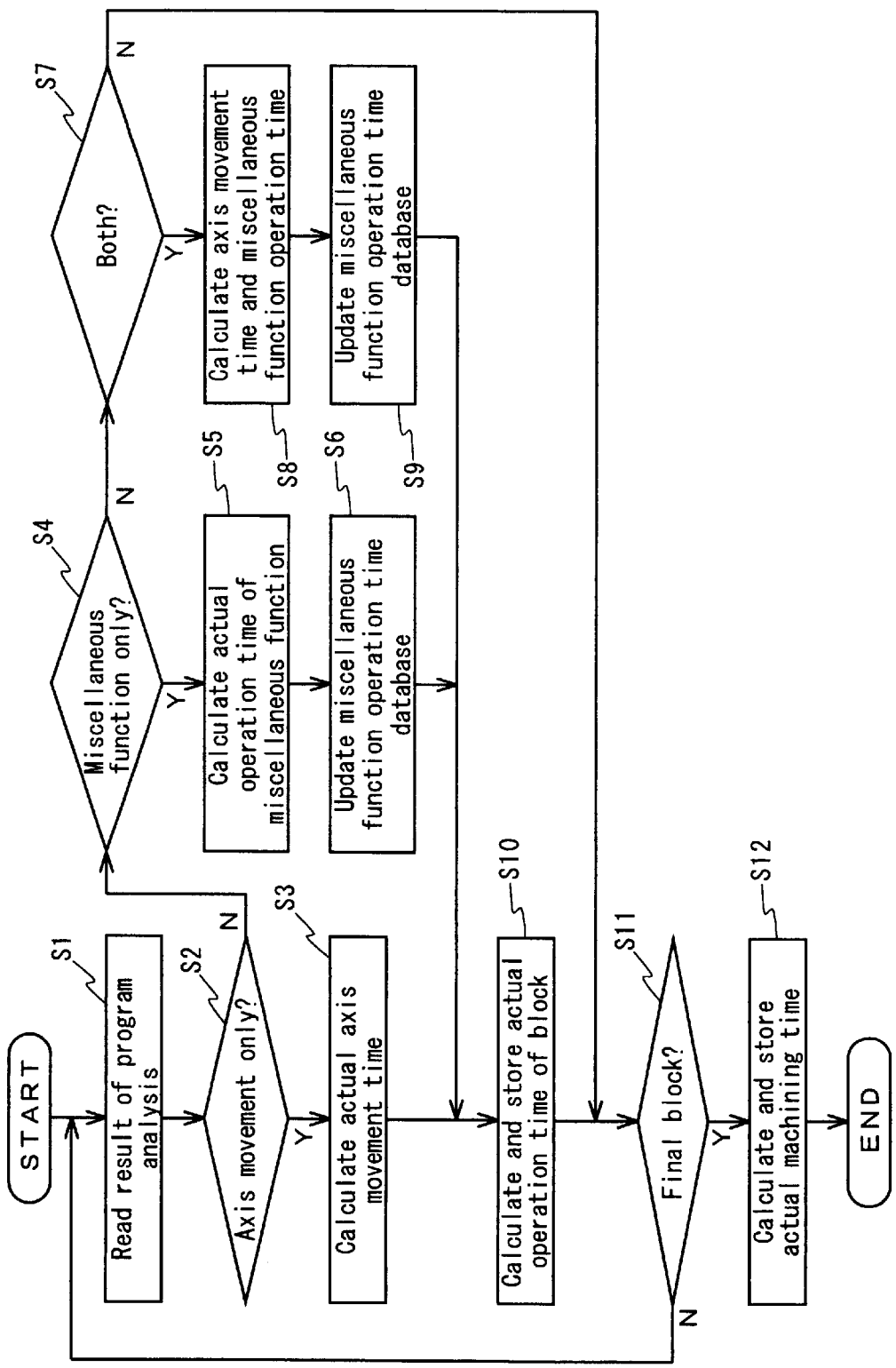
FIG. 2 is a flowchart showing a processing procedure in an actual operation time calculation section in accordance with this embodiment.

First, the process by the actual operation time calculation section 21 will be described referring to FIG. 2 and FIG. 3. As indicated in these figures, an NC program stored in the program storage section 11 is read and analyzed by the program analysis section 12, whereby the process is started. The actual operation time calculation section 21 reads the result (a control signal) of the analysis from the program analysis section 12 (step S1).

Next, a judgment is made as to whether the control signal of a read block relates to only axis movement or not (step S2). In the case of relating to only the axis movement, the actual operation time required for this axis movement is calculated (step S3). More specifically, for example, the time from the judgment time at step S2 to the time when an operation completion signal is received from the drive control section 13 is calculated on the basis of the operation clock of the CPU.

On the other hand, in the case when a judgment is made that the control signal does not relate to only the axis movement at step S2, a judgment is then made as to whether the control signal relates to only a miscellaneous function or not (step S4). In the case of relating to only the miscellaneous function, the actual operation time of the miscellaneous function is calculated (step S5). More specifically, just as described above, the time from the judgment time at step S4 to the time when an operation completion signal is received from the drive control section 13 is calculated on the basis of the operation clock of the CPU. The data stored in the miscellaneous function operation time database 22 is then updated by using data on the actual operation time of the miscellaneous function calculated in this way (step S6).

Figure 3:
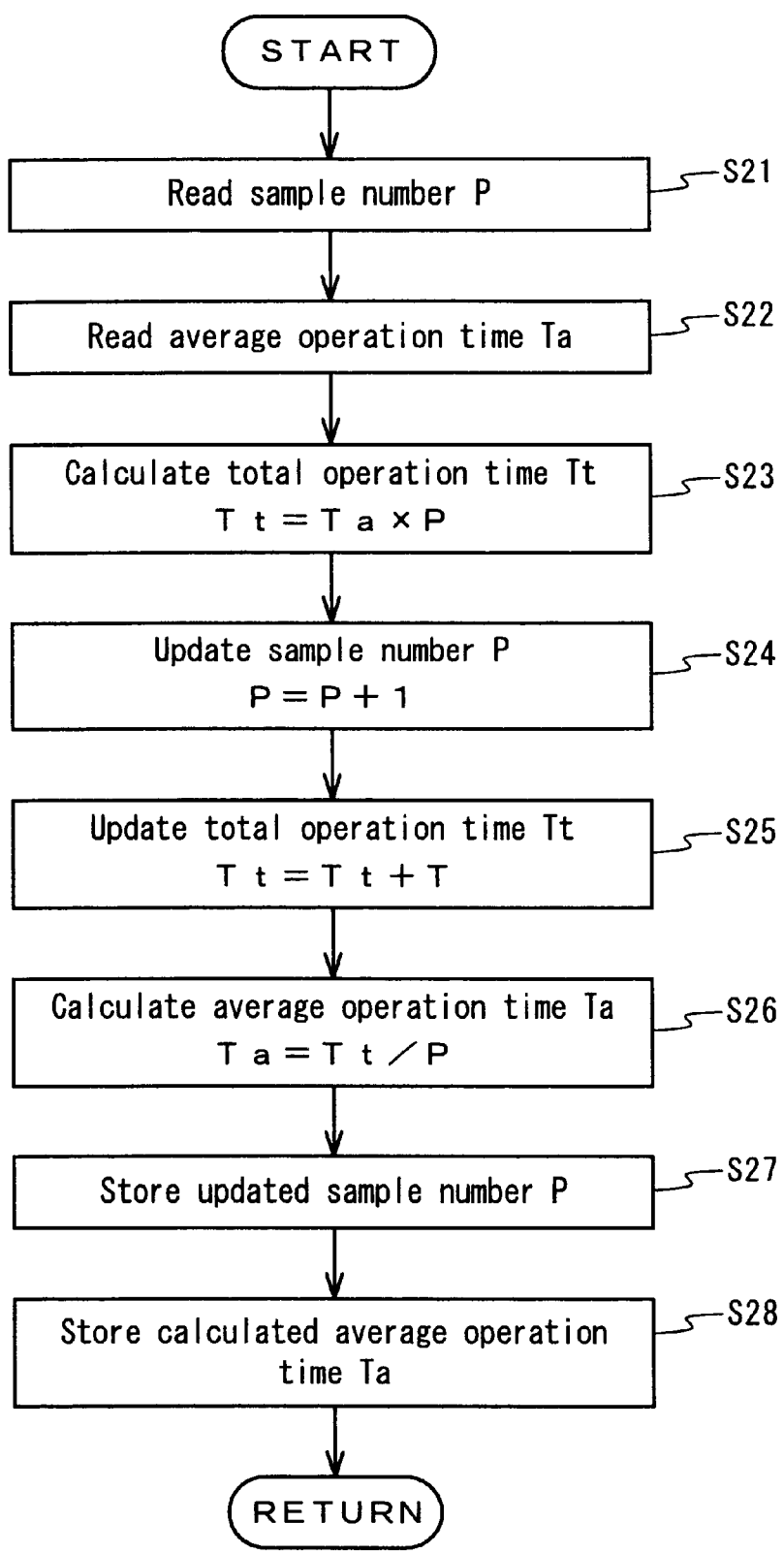
FIG. 3 is a flowchart showing a processing procedure in the actual operation time calculation section in accordance with this embodiment.

More specifically, this updating process is carried out in accordance with the procedure shown in FIG. 3. In other words, the current sample number P and the average operation time Ta of the applicable miscellaneous function are first read from the data tables exemplified in FIG. 6 to FIG. 8 (steps S21 and S22), and the total operation time Tt up to this time is calculated (step S23).

Next, the sample number P and the total operation time Tt are updated (steps S24 and S25). The updating of the total operation time Tt is carried out by adding the actual operation time T of the miscellaneous function calculated at step S5 to the preceding total operation time Tt.

Next, the average operation time Ta is calculated on the basis of the updated sample number P and the updated total operation time Tt (step S26), data on the updated sample number P and data on the updated average operation time Ta are stored in applicable data tables (steps S27 and S28), whereby the updating process is completed.

On the other hand, in the case when a judgment is made that the control signal does not relate to only the miscellaneous function at step S4, a judgment is made as to whether the control signal relates to both the axis movement and the miscellaneous function or not (step S7). In the case of relating to both the axis movement and the miscellaneous function, the actual operation times of the axis movement and the miscellaneous function are calculated (step S8). More specifically, just as described above, the time from the judgment time at step S7 to the time when an operation completion signal is received from the drive control section 13 is calculated for each of the axis movement and the miscellaneous function on the basis of the operation clock of the CPU. After this calculation, the data stored in the miscellaneous function operation time database 22 is then updated by using data on the calculated actual operation time of the miscellaneous function (step S9). The updating process at this step S9 is similar to the process at step S6.

After the processes at step S3, step S6 or step S9, the actual operation time of each block is then calculated, and the data on this actual operation time is stored in the machining time storage section 23 as the data table exemplified in FIG. 10 (step S10).

In the process at step S10, in the case when either an axis movement command or a miscellaneous function operation command is issued in the block, the actual operation time obtained at the step S3 or step S5 is used as the actual operation time of the block. In the case when both the axis movement command and the miscellaneous function operation command are issued in the block and when the axis movement and the miscellaneous function operation are carried out sequentially, the actual operation time obtained at step S8 is added, and the resultant time is used as the actual operation time of the block. In the case when the axis movement and the miscellaneous function operation are carried out in parallel with each other, the longer time of the actual operation times obtained at step S8 is used as the actual operation time of the block.

After the actual operation time of the block is calculated, the above-mentioned process is repeated until the block to be read at step S1 reaches the final block of the NC program (step S11). When the final block is reached, the total actual machining time of the NC program is calculated by adding the actual operation time of each block, which is obtained by the above-mentioned process. The data on the calculated actual machining time is stored in the machining time storage section 23 as the data table exemplified in FIG. 9 (step S12), whereby the process is completed.

Figure 4:
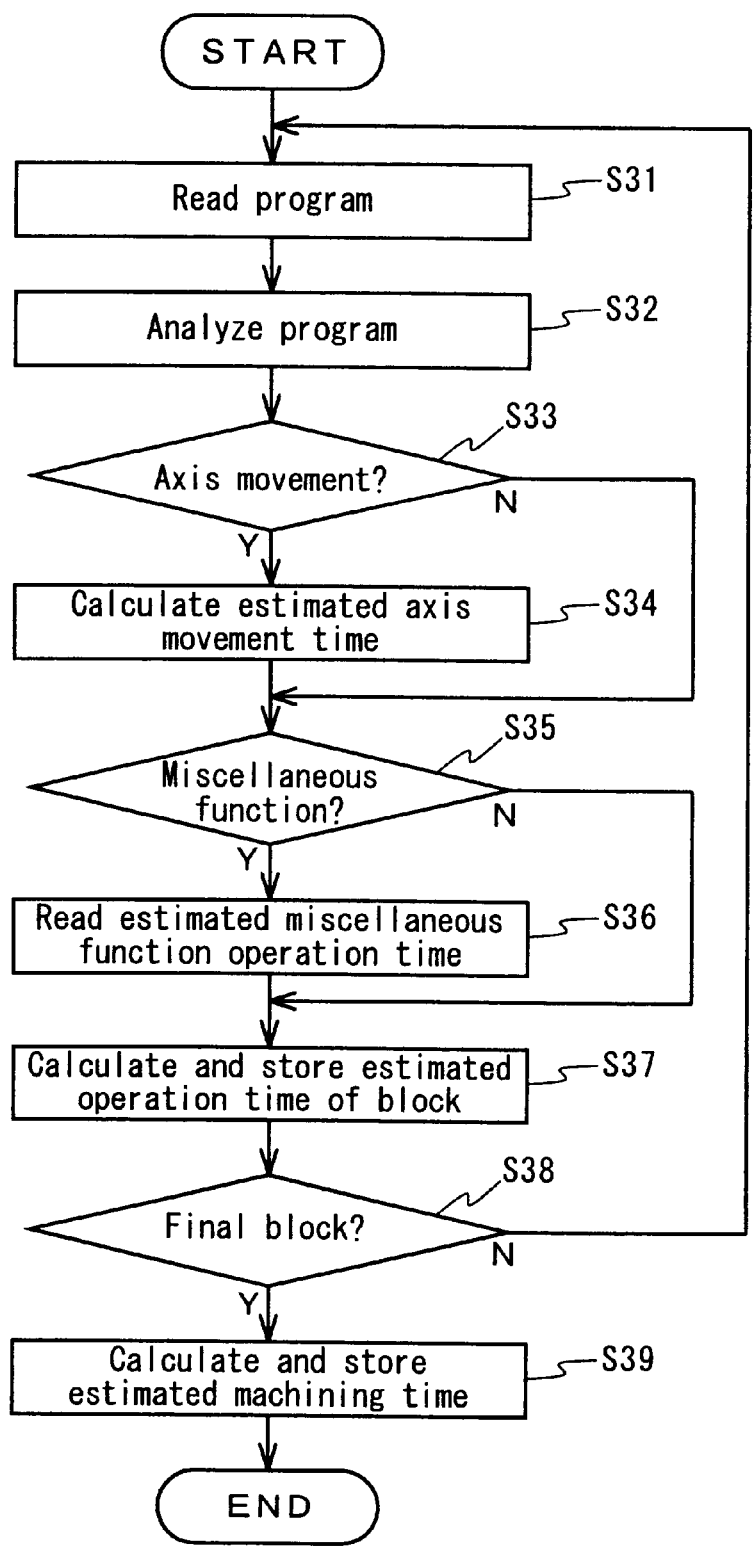
FIG. 4 is a flowchart showing a processing procedure in an operation time estimation section in accordance with this embodiment.

Next, the process by the operation time estimation section 24 will be described below referring to FIG. 4. As shown in FIG. 4, the operation time estimation section 24 first reads the program stored in the program storage section 11, block by block, and analyzes the program (steps S31 and S32).

A judgment is then made as to whether an axis movement command is included or not in the block on the basis of the result of the analysis (step S33). In the case when an axis movement command is included, the amount of the axis movement is obtained on the basis of the axis movement command, and an estimated axis movement time is calculated on the basis of the obtained amount of the axis movement and an axis feed speed (S34). In the case when the axis feed speed is commanded as a cutting feed speed in the block, the value of the speed is used. In the case of a quick traverse command, a quick traverse speed obtained from a parameter stored in the parameter storage section 14 is used. In addition, the acceleration/deceleration speed of the axis movement are also obtained from parameters stored in the parameter storage section 14.

After the process at step S34 is completed, or when it is judged that no axis movement command is included at step S33, a judgment is then made as to whether a miscellaneous function operation command is included or not in the block (step S35). In the case when a miscellaneous function operation command is included, the miscellaneous function operation time database 22 is searched on the basis of the miscellaneous function operation command, and the actual operation time of the miscellaneous function is obtained (step S36).

After the process at step S36 is completed, or when it is judged that no miscellaneous function operation command is included at step S35, the estimated operation time of the block is calculated on the basis of the estimated operation time obtained by the above-mentioned process. This estimated operation time is stored in the machining time storage section 23 as the data table exemplified in FIG. 10 (step S37).

In the process at step S37, in the case when either an axis movement command or a miscellaneous function operation command is issued in the block, the estimated operation time obtained at the step S34 or step S36 is used as the estimated operation time of the block. In the case when both the axis movement command and the miscellaneous function operation command are issued in the block and when the axis movement and the miscellaneous function operation are carried out sequentially, the estimated operation times obtained at steps S34 and S36 are added, and the resultant time is used as the estimated operation time of the block. In the case when the axis movement and the miscellaneous function operation are carried out in parallel with each other, the longer time of the estimated operation times obtained at steps S34 and S36 is used as the estimated operation time of the block.

After the estimated operation time of the block is calculated, the above-mentioned process is repeated until the block to be read at step S31 reaches the final block of the NC program (step S38). When the final block is reached, the total estimated machining time of the NC program is calculated by adding the estimated operation time of each block, which is obtained by the above-mentioned process. The data on the estimated machining time is stored in the machining time storage section 23 as the data table exemplified in FIG. 9 (step S39), whereby the process is completed.

Next, the process in the evaluation section 25 will be described referring to FIG. 5. The evaluation section 25 performs evaluating process on the basis of an NC program that is selected as necessary.

Figure 5:
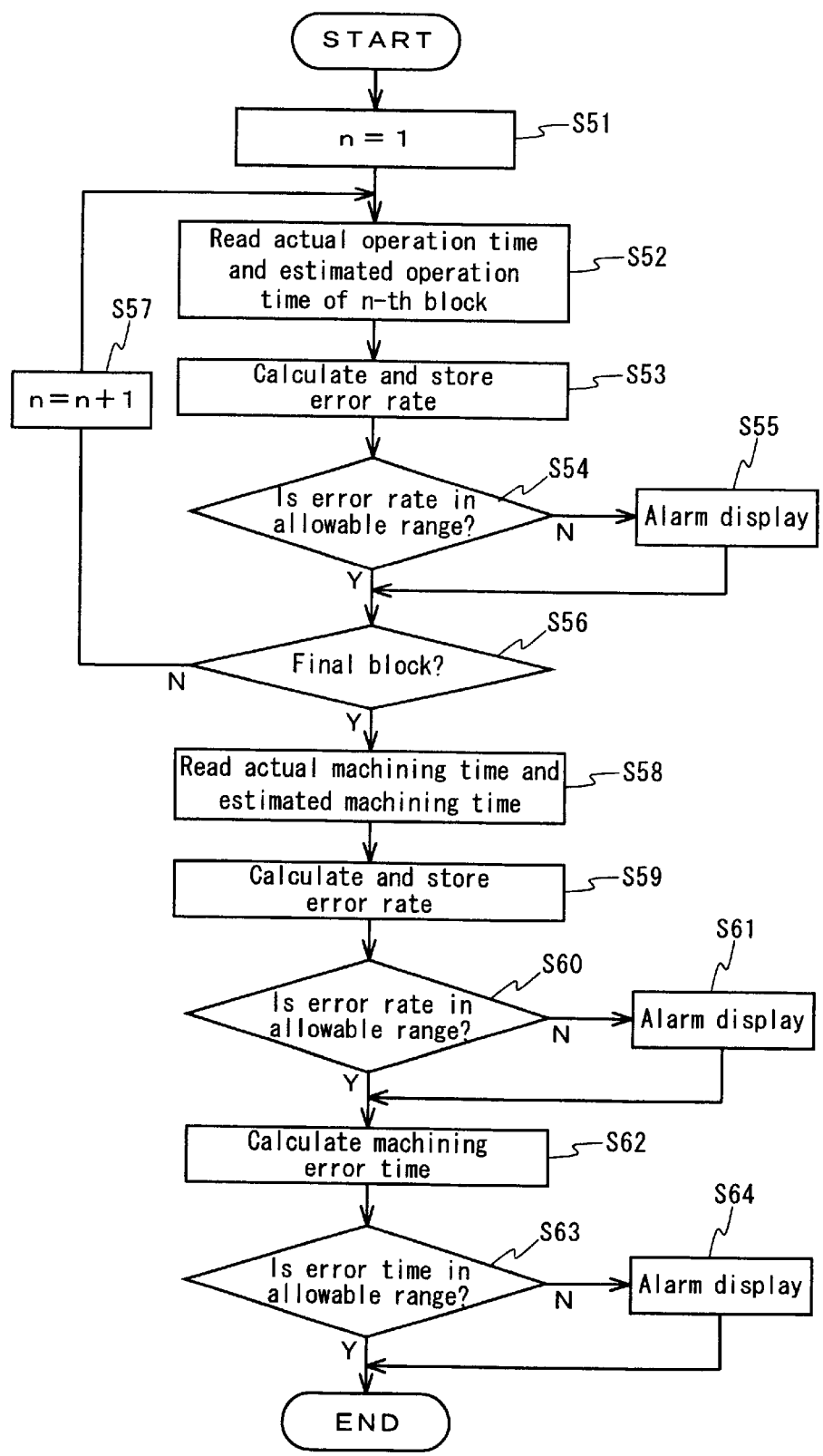
FIG. 5 is a flowchart showing a processing procedure in an evaluation section in accordance with this embodiment.

As shown in FIG. 5, the evaluation section 25 first resets a counter n (step S51), searches the data table stored in the machining time storage section 23 and exemplified in FIG. 10 and reads the actual operation time data and the estimated operation time data of the n-th block of the selected NC program (step S52).

An error rate (%) is calculated in accordance with the equation described below on the basis of the actual operation time data and the estimated operation time data having been read. The data on the calculated error rate is stored in the machining time storage section 23 as the data table exemplified in FIG. 10 (step S53).

Error rate=|(actual operation time−estimated operation time)÷actual operation time|×100

Next, the data table exemplified in FIG. 10 is searched, and a judgment is made as to whether the calculated error rate is in the range of a preset allowable error rate or not (step S54). In the case when the error rate is not in the range of the allowable error rate, an alarm is issued to the input/output device 15, and this alarm is displayed (step S55). If the cause of making the error rate to exceed the allowable error rate is known, it is preferable that the cause should be output together with the alarm.

Until the final block is reached, the counter n is updated and the above-mentioned process is repeated (steps S56 and S57).

After the error rates are calculated for all the blocks, the data table stored in the machining time storage section 23 and exemplified in FIG. 9 is searched, and the actual machining time data and the estimated machining time data of the NC program is read (step S58).

An error rate (%) is calculated in accordance with the equation described below on the basis of the actual machining time data and the estimated machining time data having been read. The data on the calculated error rate is stored in the machining time storage section 23 as the data table exemplified in FIG. 9 (step S59).

Error rate=|(actual machining time−estimated machining time)÷actual machining time ×100

Next, the data table exemplified in FIG. 9 is searched, and a judgment is made as to whether the calculated error rate is in the range of a preset allowable error rate or not (step S60). In the case when the error rate is not in the range of the allowable error rate, an alarm is issued to the input/output device 15, and this alarm is displayed (step S61). If the cause of making the error rate to exceed the allowable error rate is known, it is preferable that the cause should be output together with the alarm.

Next, after the machining error time (the error of the total machining time) is calculated by multiplying the difference between the estimated machining time and the actual machining time by the number of workpieces planned to be machined (step S62), the data table exemplified in FIG. 9 is searched, and a judgment is made as to whether the calculated machining error time is in the range of a preset allowable time or not (step S63). In the case when the machining error time is not in the allowable range, an alarm is issued to the input/output device 15, and this alarm is displayed (step S64), whereby the process is completed.

The data on the allowable error rate of each block, the data on the allowable error rate of the machining time of the NC program, the data on the allowable error time of the total machining time and the data on the number of workpieces planned to be machined are input in advance via the input/output device 15 and stored in the machining time storage section 23. In addition, the allowable error rate of each block, the allowable error rate of the machining time, the allowable error time of the total machining time may be set uniformly or independently.

In the machining time estimation apparatus 20 in accordance with this embodiment, which is provided with the above-mentioned configuration, each time actual machining is carried out by the machine tool 1, the actual operation time of each block is calculated by the actual operation time calculation section 21, and the actual machining time for the NC program is calculated. Such data is stored in the machining time storage section 23. The data stored in the miscellaneous function operation time database 22 is updated by using the data on the calculated actual operation time of the miscellaneous function. By this updating process, the reliability of the data stored in the miscellaneous function operation time database 22 is enhanced.

Furthermore, in the above-mentioned updating process, the actual operation time actually calculated is added to the total of the actual operation times calculated in the past, the average value thereof is calculated, and the data stored in the miscellaneous function operation time database 22 is replaced with the data on the calculated average value. Hence, noise data can be eliminated effectively, and the database can be a database conforming to an actual state.

The estimated operation time of each block of the NC program is then calculated and the estimated machining time for the NC program is calculated by the operation time estimation section 24 by using the database, the reliability of which is enhanced as described above. Such data is stored in the machining time storage section 23. The evaluation section 25 compares the actual operation time and the actual machining time calculated by the actual operation time calculation section 21 with the estimated operation time and the estimated machining time calculated by the operation time estimation section 24. An evaluation is thus made as to whether the result estimated by the operation time estimation section 24 conforms to the actual state of the machine tool 1.

Hence, in this machining time estimation apparatus 20, regardless of the change of the actual operation time regarding the miscellaneous function with respect to time and with respect to the incessantly changing state of the machine tool 1, the machining time is calculated by using the database reflecting these actual states. Therefore, a highly accurate machining time conforming to the actual state of the machine tool 1 can be calculated. For this reason, a machining plan to be devised by using this machining time can be made highly reliable.

On the other hand, since the evaluation section 25 compares the actual operation time of each block and the actual machining time calculated by the actual operation time calculation section 21 with the estimated operation time of each block and the estimated machining time calculated by the operation time estimation section 24, calculates the error rate therebetween and makes a judgment as to whether the calculated error rate is in the preset allowable range or not, a check as to whether the result estimated by the operation time estimation section 24 conforms to the actual state of the machine tool 1 or not can be carried out automatically.

Furthermore, in the case when the error rate is outside the allowable range, the alarm indicating the problem is issued. Therefore, the miscellaneous function operation time database 22 can be urged to be restructured so that an appropriate estimation result is obtained.

Still further, the machining error time is calculated by multiplying the difference between the estimated machining time and the actual machining time by the number of workpieces planned to be machined, a judgment is made as to whether the calculated machining error time is in the range of the preset allowable time or not, and in the case when the machining error time is not in the allowable range, an alarm is issued to the input/output device 15. Therefore, by making this evaluation immediately after the start of machining, the machining plan can be urged to be modified, whereby it is possible to prevent the machining plan from being deranged.

When data is stored in the miscellaneous function operation time database 22 in the initial state wherein no data is stored in the miscellaneous function operation time database 22 or when data is stored in the miscellaneous function operation time database 22 as described above by carrying out actual machining in the case of restructuring the miscellaneous function operation time database 22, a long time is required for data storage in the case of a long machining time, whereby prompt processing is not attained in some cases.

Figure 11:
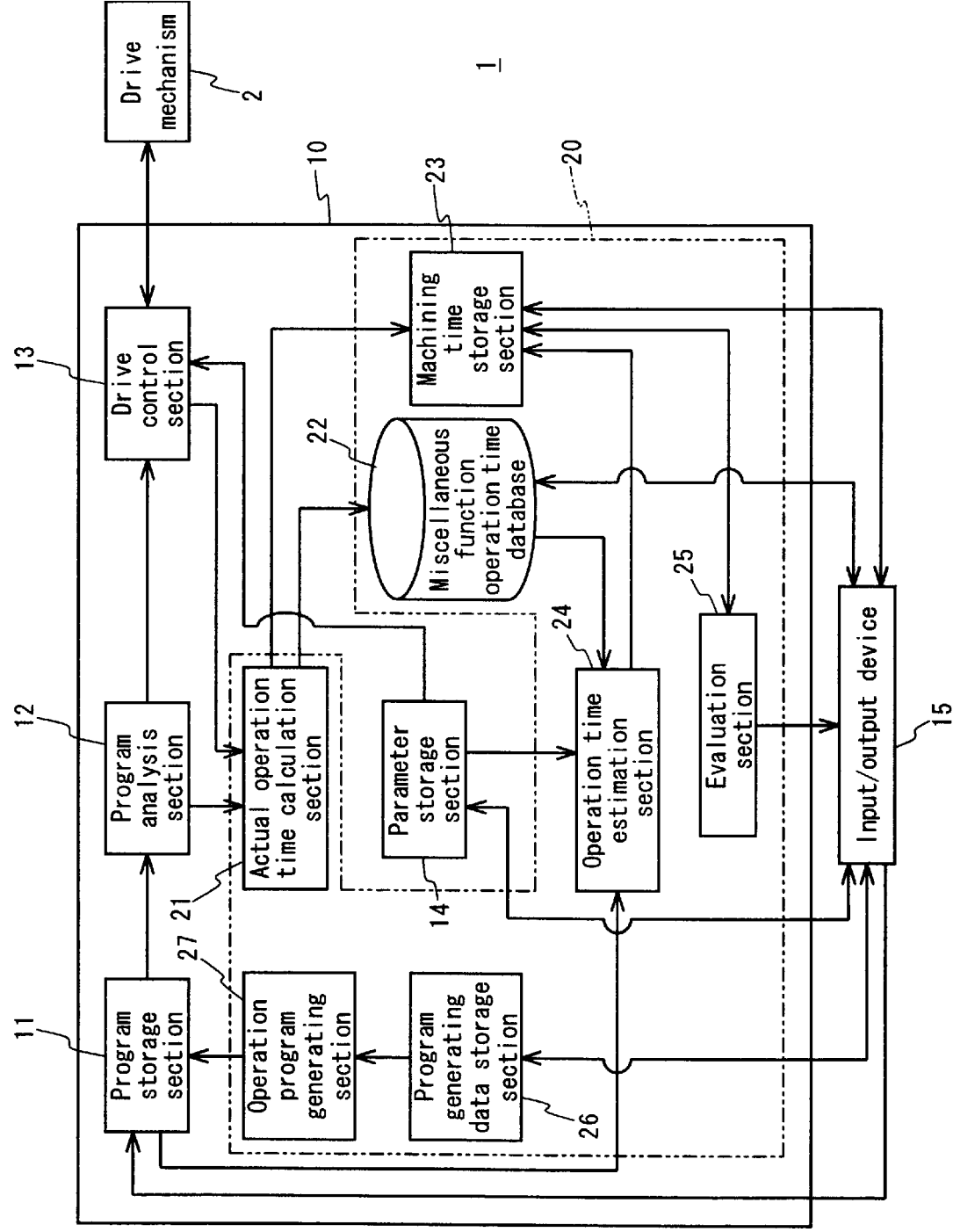
FIG. 11 is a block diagram showing a general configuration of a machining time estimation apparatus in accordance with a second embodiment of the present invention.

In such a case, as shown in FIG. 11, an operation program generating section 27 for automatically generating an operation program for storing the above-mentioned data should preferably be provided so that the drive mechanism 2 is operated by the operation program generated by this operation program generating section 27, whereby the actual operation time of the miscellaneous function is calculated by the actual operation time calculation section 21, and data on the calculated actual operation time of the miscellaneous function is stored in the miscellaneous function operation time database 22.

More specifically, the data indicated in the data tables shown in FIG. 12 and FIG. 13 is first input from the input/output device 15 and stored in a program generating data storage section 26. In the example shown in FIG. 12, such a table is displayed on the input/output device 15, and M codes to be used are input by placing check marks in the automatically creating check box columns displayed.

The operation program generating section 27 automatically crates an operation program as shown in FIG. 14 on the basis of the data exemplified in FIG. 12 and FIG. 13. Hence, by carrying out processing in this way, data can be stored in the miscellaneous function operation time database 22, and the database can be updated without carrying out actual machining, whereby the reliability of the database can be enhanced efficiently.

Although an embodiment of the present invention has been explained above, specific embodiments attainable by the present invention are not limited to the above-mentioned embodiment at all.

For example, in the above-mentioned embodiment, the machining time estimation apparatus 20 is incorporated in the numerical controller 10. However, without being limited to this, the machining time estimation apparatus 20 may be provided independently of the numerical controller 10. In this case, it is possible to form a configuration wherein the machining time estimation apparatus 20 is connected to a plurality of numerical controllers 10 via a communication network so that the machining times of a plurality of the machine tools 1 can be estimated by the single machining time estimation apparatus 20.

What is claimed is:

1. A machining time estimation apparatus for a numerical control (NC) machine tool, which estimates the machining time of said NC machine tool, comprising:

a program storage section for storing an NC program formed of a plurality of command blocks, a program analysis section for reading said NC program stored in said program storage section, for analyzing said NC program, block by block, and for outputting a control signal on the basis of the result of the analysis, a drive control section for receiving said control signal output from said program analysis section and for controlling the operation of each drive mechanism concerned with the axis movement and miscellaneous functions of said NC machine tool on the basis of the received control signal, wherein said machining time estimation apparatus further comprises:

a database for storing the actual operation time data of said drive mechanism concerned with said miscellaneous functions, actual operation time calculation means for calculating the actual operation time of said drive mechanism concerned with at least said miscellaneous functions on the basis of said control signal output from said program analysis section and an operation completion signal obtained from said drive mechanism and for updating the data stored in said database by using data on the calculated actual operation time, and operation time estimation means for analyzing each block of said NC program stored in said program storage section, for calculating the estimated operation time of said drive mechanism concerned with said axis movement on the basis of the result of the analysis, for estimating the operation time of said drive mechanism concerned with said miscellaneous functions by searching said database on the basis of the result of the analysis, for calculating the estimated operation time of each block on the basis of the estimated operation time of said drive mechanism concerned with said axis movement and the estimated operation time of said drive mechanism concerned with said miscellaneous functions, and for calculating the estimated machining time by totalizing the estimated operation time of each block.

2. A machining time estimation apparatus for an NC machine tool in accordance with claim 1, wherein said actual operation time calculation means is configured, instead of carrying out said process, to calculate the actual operation time of said drive mechanism concerned with said axis movement and the actual operation time of said drive mechanism concerned with said miscellaneous functions on the basis of said control signal output from said program analysis section and said operation completion signal obtained from said drive mechanism, to calculate the actual operation time of each block on the basis of the calculated actual operation time of said drive mechanism concerned with said axis movement and the calculated actual operation time of said drive mechanism concerned with said miscellaneous functions, to calculate an actual machining time by totalizing the calculated actual operation time of each block, and to update data stored in said database by using data on the calculated actual operation time of said drive mechanism concerned with said miscellaneous functions.

3. A machining time estimation apparatus for an NC machine tool in accordance with claim 2, further comprising:

machining time storage means for storing data on the time calculated by said actual operation time calculation means and the time calculated by said operation time estimation means and evaluation means for evaluating the operation state of said drive mechanism by comparing the time data calculated by said actual operation time calculation means and stored in said machining time storage means with the time data calculated by said operation time estimation means and stored in said machining time storage means.

4. A machining time estimation apparatus for an NC machine tool in accordance with claim 3, wherein said evaluation means is configured to compare the actual operation time data of each block calculated by said actual operation time calculation means with the estimated operation time data of each block calculated by said operation time estimation means and to calculate the error rate therebetween.

5. A machining time estimation apparatus for an NC machine tool in accordance with claim 4, wherein said evaluation means is configured to output an alarm in the case when said error rate exceeds an allowable value.

6. A machining time estimation apparatus for an NC machine tool in accordance with claim 3, wherein said evaluation means is configured to compare the actual machining time data calculated by said actual operation time calculation means with the estimated machining time data calculated by said operation time estimation means and to calculate the error rate therebetween.

7. A machining time estimation apparatus for an NC machine tool in accordance with claim 6, wherein said evaluation means is configured to output an alarm in the case when said error rate exceeds an allowable value.

8. A machining time estimation apparatus for an NC machine tool in accordance with any one of claims 1 to 7, further comprising program generating means for receiving the input of command codes corresponding to said miscellaneous functions from the outside, for automatically generating an NC program, that operates said drive mechanisms concerned with said miscellaneous functions and is used to update said database, on the basis of the received command codes, and for storing said automatically generated NC program in said program storage section.

* * * * *